United States Patent Office 3,513,241
Patented May 19, 1970

3,513,241
FUNGICIDAL AND FUNGISTATIC N-(DIALKYL-AMINOALKYL) - CARBAMIC ACID AND THIO-CARBAMIC ACID ESTERS
Georg-Alexander Hoyer and Ernst Albrecht Pieroh, Berlin, Germany, assignors to Schering AG Berlin & Bergkamen, Berlin, Germany
No Drawing. Filed Dec. 11, 1967, Ser. No. 689,310
Claims priority, application Germany, Dec. 17, 1966, Sch 39,978
Int. Cl. A01n 7/00, 9/12, 9/20
U.S. Cl. 424—300                                    1 Claim

ABSTRACT OF THE DISCLOSURE

Compounds containing N - (dialkylaminoalkyl) - carbamic acid esters and/or N-(dialkylaminoalkyl)-thiocarbamic esters are used either per se or in conjunction with other ingredients for use as fungicides or fungistats.

It has been found that compounds of the general formula:

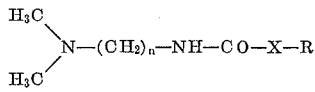

in which R is an aliphatic hydrocarbon radical, preferably containing 1 to 8 carbon atoms, X oxygen or sulfur, and $n$ an integer from 1 to 5, exhibit a fungicidal and fungistatic action and therefore are suitable preferably for the control of phytopathogenic fungi.

---

The invention relates to fungicidal and fungistatic agents containing N-(dialkylaminoalkyl)-carbamic acid esters and respectively N-(dialkylaminoalkyl)-thiocarbamic acid esters.

It is to be noted that compounds wherein in the above stated general formula, R represents a straight-chain or branched, saturated or unsaturated hydrocarbon radical with 1 to 8 carbon atoms, as for example, methyl, ethyl, propyl, butyl, pentyl, hexyl, octyl, isopropyl, isobutyl, tertiary butyl, allyl, propargyl, or butyne-(1)-yl-(3), have a particularly good and effective action for said control.

The compounds to be used according to the invention are surprisingly distinguished by an excellent action against *Pythium ultimum* which, in part, exceeds the effect of similarly acting products that have become known for this. The effect as disinfecting steep to promote germination of the seed is also considerable and better than that of heretofore known agents.

Agents which contain one or more of the aforementioned compounds can therefore find application, for example, in agriculture or horticulture as disinfecting steeps for seed treatment, for seed row treatment as so-called drill-in agent or for general soil treatment and the like.

The partly new active ingredients can be produced by methods known in the art. For example, the dimethylaminomethyl carbamic acid esters wherein $n=1$ are prepared by reaction of the respective carbamic acid ester with formaldehyde and dimethylamine in water at room temperature or elevated temperature. The other esters wherein $n=2$ to 5 may be obtained by the reaction of a dimethylaminoalkyl amine with a chloroformic acid ester or chloroformic acid thioester in a suitable solvent, possibly in the presence of an acid acceptor. As solvents, there may be used, for example, inert organic liquids, such as ether or hydrocarbons. Suitable acid acceptors are tertiary organic amines, namely triethylamine or pyridine, etc., inorganic bases, namely alkali hydroxides or carbonates, etc., or also the amine required for the reaction, which is then used in correspondingly higher quantity. The reaction proceeds smoothly in a temperature range from about 0 to 100° C., but can be carried out also at higher or lower temperatures. The conversion may be conducted as a one-phase or two-phase reaction, the latter with the use of non-miscible liquids, such as water and an organic solvent.

Compounds to be preferably used according to the present invention are, for example, the following:

| Name of compound | Physical constant |
|---|---|
| N-(γ-dimethylaminopropyl)-carbamic acid propyl ester. | B.P. (18 mm.) 139–141° C. $n^D{}_{20}$=1.4490. |
| N-(γ-dimethylaminopropyl)-carbamic acid isobutyl ester. | B.P. (0.05 mm.) 100–102° C. $n^D{}_{20}$=1.4460. |
| N-(γ-dimethylaminopropyl)-carbamic acid allyl ester. | B.P. (20 mm.) 136–138° C. $n^D{}_{20}$=1.4598. |
| N-(γ-dimethylaminopropyl)-thiocarbamic acid-S-ethyl ester. | Undistillable oil. $n^D{}_{20}$=1.4965. |
| N-(β-dimethylaminoethyl)-carbamic acid butyl ester. | B.P. (18 mm.) 132–138° C. $n^D{}_{20}$=1.4470. |
| N-(4-dimethylaminobutyl)-carbamic acid ethyl ester. | B.P. (18 mm.) 140–143° C. $n^D{}_{20}$=1.4500. |
| N-(γ-dimethylaminopropyl)-thiocarbamic acid-S-propyl ester. | Undistillable oil. $n^D{}_{20}$=1.4940. |
| N-(γ-dimethylaminopropyl)-carbamic acid butyne(1)-yl-(3) ester. | B.P. (0.35 mm.) 123–124° C. $n^D{}_{20}$=1.4640. |

The active ingredients may be used singly or as mixtures of several ingredients. If desired, other fungicides, nematocides, herbicides, disinfectants or other pest control agents may be added, depending on the purpose intended. Advantageously, the active ingredients are used in the form of suitable preparations, such as powders, scatter materials, granulates, solutions, emulsions or suspensions, with addition of liquid and/or solid vehicles or diluents and also of wetting, adhesive, emulsifying and/or dispersing aids.

Suitable liquid vehicles are water, mineral oils, or other organic solvents, such as xylol (xylene), chlorobenzene, cyclohexanol, cyclohexanone, dioxane, acetonitrile, acetic ester, dimethyl formamide and dimethyl sulfoxide, etc.

As solid vehicles, there may be used lime, kaolin, chalk, talcum, attaclay and other clays, as well as natural or synthetic silica, i.e., silicic acid.

Among surface-active substances that may be used are salts of the lignin sulfonic acids, salts of alkylated benzene sulfonic acids, sulfonated acid amines and their salts, polyethoxylated amines and alcohols.

If the active ingredients are to be used for seed disinfection, there also may be added dyes, such as new fuchsine, etc., to give the steeped seed a distinctly visible coloration.

The proportion of ingredients in the agent may vary within wide limits, the exact concentration of the ingredient used for the agents depending mainly on the quantity in which the agents are to be used for soil or seed treatment, etc. For example, the agents contain between about 1 and 80 percent by weight, preferably between about 20 and 50 percent by weight of active ingredient and about 99 to 20 percent by weight of liquid or solid vehicle and possibly up to 20 percent by weight of surface-active substances in the form of an emulsion or of a dry disinfectant.

To promote germination of the seed, the agents are applied either before sowing directly on the seed or when sowing into the furrow, i.e., so-called drilling in. When treating the soil as such, the agents are advantageously introduced into the upper soil layers to a depth of about 20 cm., such as by hoeing in.

The following illustrative examples will explain the invention.

EXAMPLE 1

Unsteamed compost soil was additionally seeded with mycelium of *Pythium ultimum*. After uniform mixing of the agents with the uninfected soil, there followed without waiting period per concentration the seeding out of 25 grains of narrow peas of the variety "Miracle of Kelvedon" in clay dishes holding 1 liter of soil. In the following table, there are stated the number of germinated healthy peas, the root rating (1 to 4) and the weight of the fresh plant after a cultivation time of 3 weeks at 22 to 24° C. CAPTAN (N-trichloromethylthio-tetrahydrophthalamide) was used as a reference agent. The preparations were a powder containing 20% by weight of active ingredient.

| Preparation: | Active ingredients per liter of soil, mg. | Number of healthy peas | Root rating | Weight of fresh plant, g. |
|---|---|---|---|---|
| N-(γ-dimethylaminopropyl)-carbamic acid propyl ester | 50 | 21 | 4 | 13 |
|  | 100 | 24 | 4 | 17 |
|  | 200 | 25 | 4 | 18 |
| N-(γ-dimethylaminopropyl)-thiocarbamic acid-S-ethyl ester | 50 | 20 | 4 | 12 |
|  | 100 | 17 | 4 | 12 |
|  | 200 | 20 | 4 | 14 |
| N-(β-dimethylaminoethyl)-carbamic acid butyl ester | 50 | 19 | 1 | 20 |
|  | 100 | 20 | 3 | 20 |
|  | 200 | 24 | 4 | 22 |
| N-(γ-dimethylaminopropyl)-carbamic acid allyl ester | 50 | 16 | 3 | 20 |
|  | 100 | 21 | 4 | 25 |
|  | 200 | 20 | 4 | 22 |
| N-(γ-dimethylaminopropyl)-carbamix acid isobutyl ester | 50 | 18 | 1 | 19 |
|  | 100 | 15 | 2 | 20 |
|  | 200 | 22 | 2 | 24 |
| N-(γ-dimethylaminopropyl)-carbamic acid butyne-(1)-yl-(3) ester | 50 | 9 | 1 | 4 |
|  | 100 | 12 | 1 | 6 |
|  | 200 | 20 | 2 | 17 |
| CAPTAN | 50 | 5 | 1 | 2 |
|  | 100 | 10 | 1 | 5 |
|  | 200 | 18 | 1 | 10 |
| Steamed soil (3 control tests): |  |  |  |  |
| A |  | 21 | 4 | 16 |
| B |  | 24 | 4 | 16 |
| C |  | 24 | 4 | 17 |
| Untreated soil (3 control tests): |  |  |  |  |
| A |  | 0 |  |  |
| B |  | 2 | 1 |  |
| C |  | 1 | 1 |  |

Note—Root rating:
4=White roots without fungus necrosts.
3=White roots, slight fungus necrosts.
2=Brown roots, more advanced fungus necrosts.
1=Advanced fungus necrosts, roots rotted.

EXAMPLE 2

This example illustrates the drill-in method in sowing cotton.

Clay dishes holding 2 liters of soil were filled with unsteamed compost soil. For 20 cm. of furrow, the agents were scattered in the form of a powder containing 20 percent by weight of active ingredient. There then followed per concentration, the sowing of 25 grains of delintered cotton. In the table, there is stated the number of germinated healthy cotton seedlings and the fresh plant weight after cultivation time of 20 days at 22 to 24° C. As a reference agent MANEB (manganoethylene-bis-dithio-carbamate) was used.

| Preparation: | Mg. of active ingredients per 20 cm. of furrow | Number of healthy plants | Weight of fresh plant g. |
|---|---|---|---|
| N-(dimethylaminoethyl)-carbamic acid butyl ester | 10 | 21 | 38 |
|  | 20 | 19 | 40 |
|  | 40 | 21 | 42 |
|  | 80 | 18 | 40 |
| N-(γ-dimethylaminopropyl)-carbamic acid allyl ester | 10 | 22 | 40 |
|  | 20 | 20 | 40 |
|  | 40 | 25 | 50 |
|  | 80 | 21 | 40 |
| N-(γ-dimethylaminopropyl)-carbamic acid isobutyl ester | 10 | 12 | 28 |
|  | 20 | 18 | 38 |
|  | 40 | 24 | 45 |
|  | 80 | 23 | 45 |
| MANEB | 10 | 12 | 24 |
|  | 20 | 9 | 22 |
|  | 40 | 11 | 30 |
|  | 80 | 18 | 30 |
| Steamed soil (2 control tests): |  |  |  |
| A |  | 21 | 50 |
| B |  | 17 | 54 |
| Untreated soil (2 control tests): |  |  |  |
| A |  | 9 | 22 |
| B |  | 10 | 23 |

EXAMPLE 3

The drill-in method was used in the sowing of cotton for the control of *Pythium ultimum*.

Steamed compost soil was seeded with mycelium of *Pythium ultimum* and then clay dishes holding 2 liters were filled with this soil. The stated active ingredient quantity was scattered as a 20% powder per 20 cm. of furrow. Then followed by concentration, the sowing of 25 grains of delintered cotton. In the table there are given the number of germinated healthy cotton seedlings and the weight of the fresh plant after a cultivation time of 25 days at 22 to 24° C. The reference agent in those examples was CAPTAN (N-trichloro-methylthio-tetrahydrophthalimide).

| Preparation: | Active ingredient per 20 cm. of furrow, mg. | Number of healthy peas | Weight of fresh plant, g. |
|---|---|---|---|
| N-(β-dimethylaminoethyl)-carbamic acid butyl ester | 10 | 16 | 34 |
|  | 20 | 23 | 50 |
|  | 40 | 22 | 45 |
|  | 80 | 23 | 49 |
| N-(γ-dimethylaminopropyl)-carbamic acid propyl ester | 10 | 16 | 34 |
|  | 20 | 17 | 33 |
|  | 40 | 21 | 43 |
|  | 80 | 24 | 47 |
| N-(γ-dimethylaminopropyl)-thiocarbamic-S-ethyl ester | 10 | 17 | 39 |
|  | 20 | 21 | 45 |
|  | 40 | 21 | 44 |
|  | 80 | 14 | 31 |
| CAPTAN | 10 | 4 | 6 |
|  | 20 | 7 | 13 |
|  | 40 | 15 | 26 |
|  | 80 | 7 | 15 |
| Steamed soil (3 control tests): |  |  |  |
| A |  | 18 | 37 |
| B |  | 20 | 35 |
| C |  | 18 | 34 |
| Untreated soil (3 control tests): |  |  |  |
| A |  | 6 | 9 |
| B |  | 4 | 4 |
| C |  | 9 | 16 |

EXAMPLE 4

Unsteamed compost soil was additionally seeded with mycelium of *Pythium ultimum*. Peas of the variety "Miracle of Kelvedon" steeped with 50-percentual product formulations, were set out 2 to 3 cm. deep in clay dishes holding 0.5 liter of soil; per concentration 25 grains. After a cultivation time of 14 days at 22 to 24° C., the number of germinated healthy peas was recorded. Comparison was made with MANEB (mangano-ethylene-bis - dithiocarbamate) and TMTD (tetramethyl-thiuram-disulfide).

| | Number of germinated healthy peas | |
|---|---|---|
| | 0.5 g. active ingredient per kg. of seed | 1.5 g. active ingredien per kg. of seed |
| Preparation: | | |
| N-(γ-dimethylaminopropyl)-carbamic acid propyl ester | 25 | 21 |
| N-(4-dimethylaminobutyl)-carbamic acid ethyl ester | 22 | 22 |
| N-(γ-dimethylaminopropyl)-carbamic acid allyl ester | 14 | 22 |
| N-(γ-dimethylaminopropyl)-carbamic acid butyne-(1)-yl-(3)-ester | 14 | 21 |
| N-(β-dimethylaminoethyl)-carbamic acid butyl ester | 16 | 17 |
| N-(γ-dimethylaminopropyl)-thiocarbamic acid-S-propylester | 20 | 23 |
| MANEB | 10 | 11 |
| TMTD | 13 | 10 |
| Steamed soil, seed not steeped (4 control tests): | | |
| A | | 22 |
| B | | 20 |
| C | | 22 |
| D | | 20 |
| Untreated soil, seed not steeped (4 control tests): | | |
| A | | 1 |
| B | | 2 |
| C | | 0 |
| D | | 3 |

From the foregoing examples taken in conjunction with the description of the invention, it will be noted that fungicides and fungistats are provided per se or in conjunction with other ingredients and fillers acting as adjuvants to effect the desired result.

What is claimed is:

1. A method for seed and soil treatment which comprises treating said seed and soil with an effective amount of a fungicidal and fungistatic agent, said agent comprising:
   (a) from 1 to 80 percent by weight of a compound having the formula

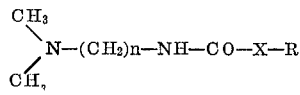

where R is an aliphatic hydrocarbon containing 1 to 8 carbon atoms, X is oxygen or sulfur, and $n$ is an integer from 1 to 5;
   (b) up to 20 percent by weight of a surface active substance selected from the group consisting of lignin sulfonic acid salts, salts of alkylated benzene sulfonic acids, sulfonated acid amides, salts of said acid amides, polyethoxylated amines and polyethoxylated alcohols and;
   (c) from 99 to 20 percent by weight of a fungicidal diluent.

References Cited

UNITED STATES PATENTS 2,948,655  8/1960  Flenner.
3,163,536  12/1964  Nishio et al.

OTHER REFERENCES

Chem. Abstracts, vol. 65, p. 18528f (1966).

ALBERT T. MEYERS, Primary Examiner
V. D. TURNER, Assistant Examiner

U.S. Cl. X.R.

260—455, 482